Jan. 8, 1963 J. R. RALSTON 3,072,275
LOADER AND CARRIER FOR AN AUTOMOBILE
Filed July 15, 1960 3 Sheets-Sheet 1
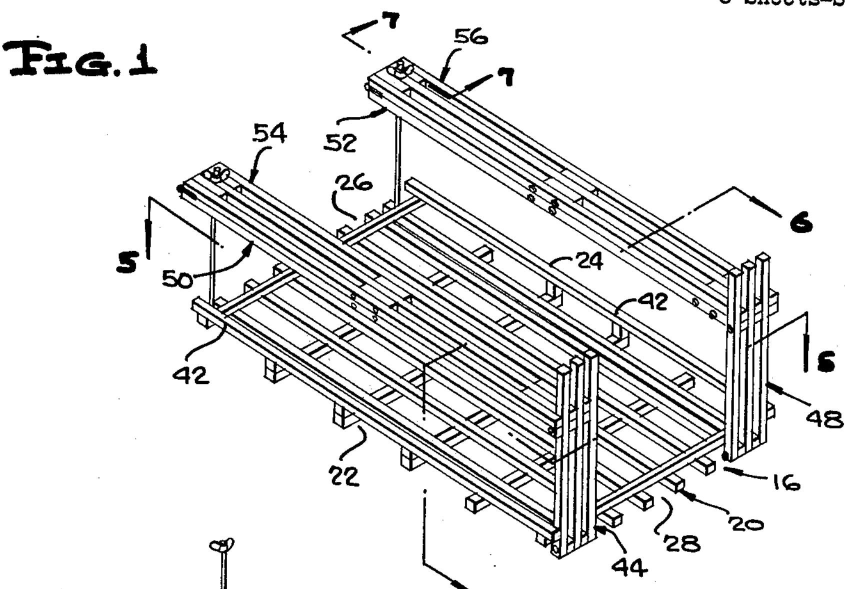
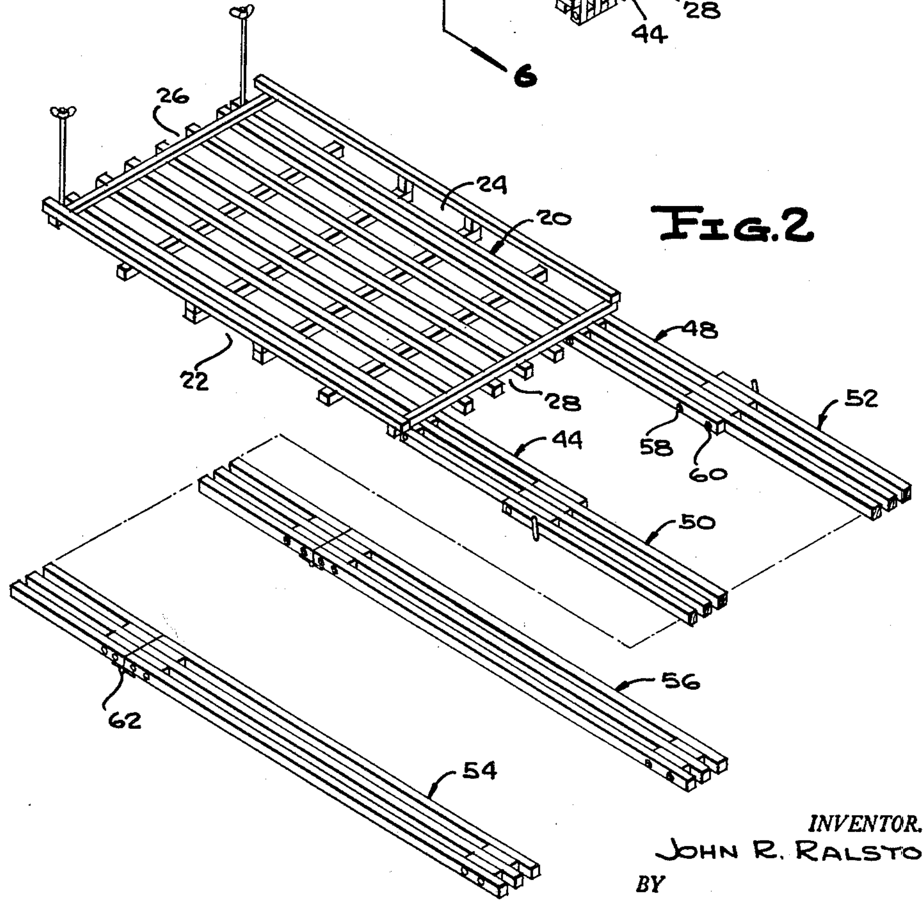
INVENTOR.
JOHN R. RALSTON
BY
McMorrow, Berman & Davidson
ATTORNEYS

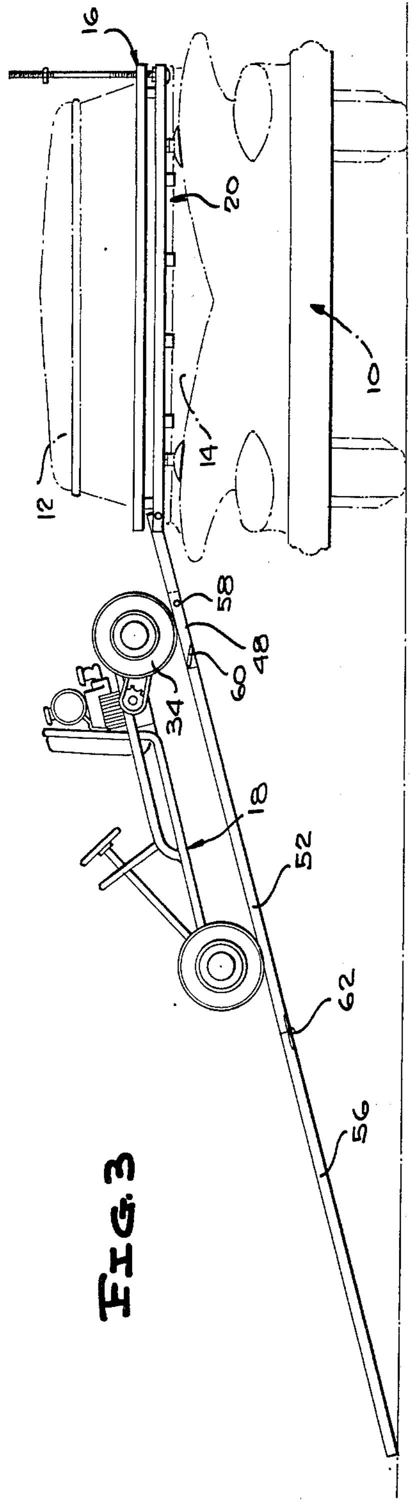
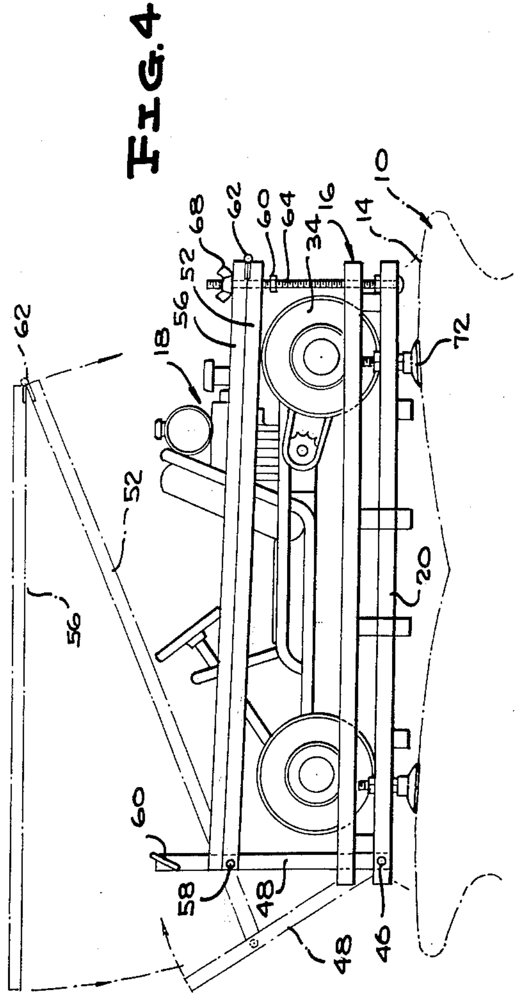
INVENTOR.
JOHN R. RALSTON
BY
McMorrow, Berman & Davidson
ATTORNEYS LOADER AND CARRIER FOR AN AUTOMOBILE
Filed July 15, 1960 3 Sheets-Sheet 3
FIG. 5
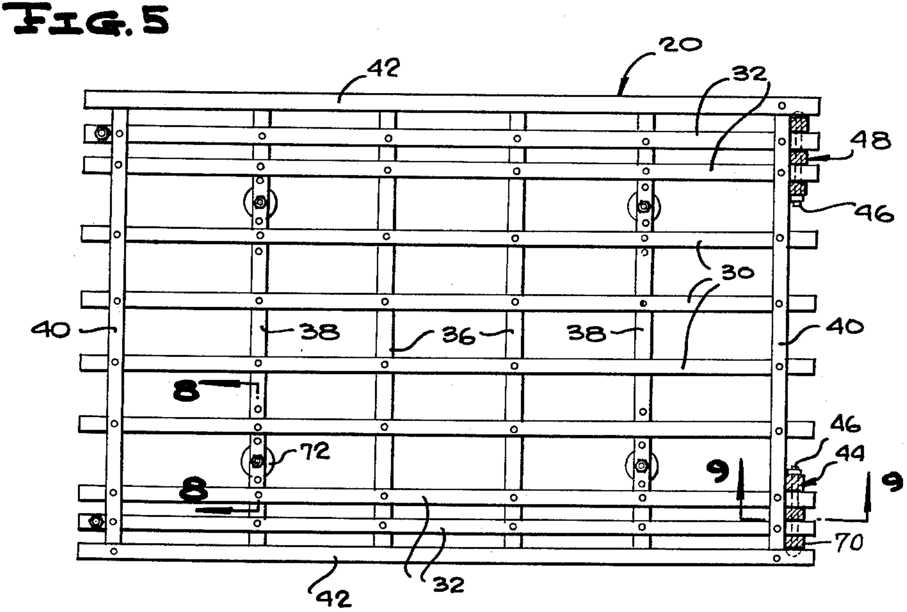
FIG. 6
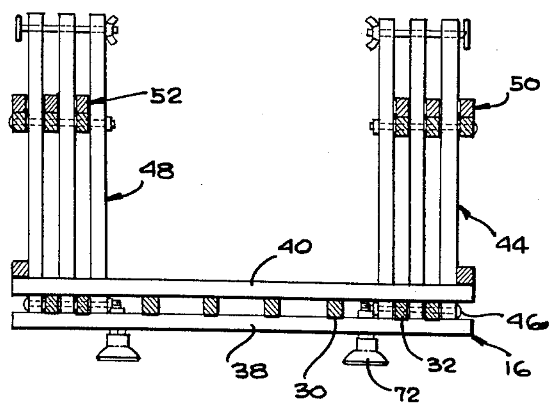
FIG. 7
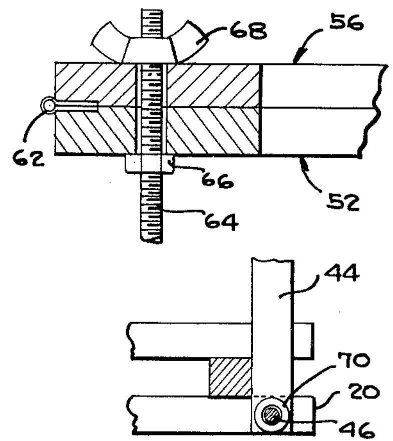
FIG. 9
FIG. 8
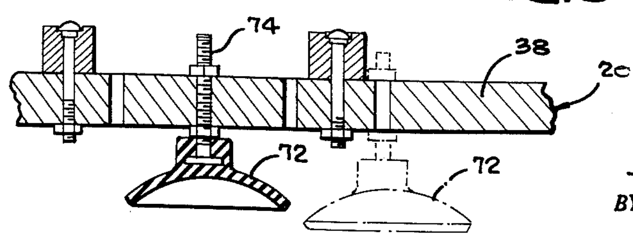
INVENTOR.
JOHN R. RALSTON
BY
McMorrow, Berman & Davidson
ATTORNEYS 3,072,275

LOADER AND CARRIER FOR AN AUTOMOBILE

John R. Ralston, 51 N. Main St., Kingston, Ohio

Filed July 15, 1960, Ser. No. 43,232
6 Claims. (Cl. 214—450)

The present invention relates to car top carriers generally, and in particular to a combined loading device and carrier for transporting a miniature racing automobile.

The recently inaugurated sport of racing miniature automobiles is expanding rapidly in most localities. Young people unable to drive on highways due to the age requirements of the licensing authorities of most states have found an outlet for their interest in automotive vehicles in the sporting of racing small vehicles on non-public paved areas, such as parking lots of commercial establishments. Some of the vehicles driven by the young people are available commercially, and others are constructed from kits or from commercially available lawn mower engines, and the like. A prime consideration is that, for reasons of safety, each racing vehicle must be constructed of such material as to make it strong against collapsing and strong against inadvertent collision.

The use of strengthening cross members and other features designed to protect the occupant of the vehicle results in an increase in weight in the vehicle. The transport of such a racing vehicle has presented a problem, and as such vehicles may not be run under their own power over a public highway, other means must be provided for transporting the racing vehicles from one race location to another, or from the home of the user to the race location.

An object of the present invention is to provide a loader and carrier for a miniature automotive vehicle, which is easily and with facility attached to a decking of an automobile, the decking being any flat surface, such as the top of the trunk compartment, or the roof of the vehicle.

Another object of the present invention is to provide a loader and carrier for transporting a racing automobile in miniature form, which enables a person, with ease and facility, to load a minature racing automobile and the carrier when the carrier is attached to the roof or trunk compartment of an automobile, the loader not requiring mechanical means or more than average human strength to move a miniature racing automobile from the loaded position to an unloaded position, or from the unloaded position to a loaded position.

A further object of the present invention is to provide a loader and carrier means for an automotive vehicle of miniature size, which is sturdy in construction, one which is relatively light in weight, one which has means for securing a miniature automobile thereon when in the loaded condition, one which is economically feasible, and one which is highly effective in action.

These and other objects and advantages of the present invention will be fully apparent from the following description when taken in conjunction with the annexed drawings, in which:

FIGURE 1 is an isometric view of the loader and carrier, shown in the loaded condition, FIGURE 2 is an exploded isometric view of the assembly shown in FIGURE 1, shown in the loading condition, FIGURE 3 is a rear elevational view of an automobile, showing the loader and carrier mounted upon the trunk compartment and showing a racing automobile on the loader in a position for unloading onto a ground surface or loading onto the carrier, FIGURE 4 is a view of the assembly shown in FIGURE 3 in loaded condition, the dotted lines indicating the movement of the three sections of the trackway from the loaded position to the unloading position of FIGURE 3, FIGURE 5 is a view on an enlarged scale, taken on the line 5—5 of FIGURE 1, FIGURE 6 is a view on an enlarged scale, taken on the line 6—6 of FIGURE 1, FIGURE 7 is a view on an enlarged scale, taken on the line 7—7 of FIGURE 1, FIGURE 8 is a view on an enlarged scale, taken on the line 8—8 of FIGURE 5, and FIGURE 9 is a view on an enlarged scale, taken on the line 9—9 of FIGURE 5.

Referring in detail to the drawings, in which like numerals indicate like parts throughout the several views, the reference numeral 10, in FIGURES 3 and 4, represents an automotive vehicle having a roof 12 and a trunk compartment top 14. Either the roof 12 or the compartment top 14 constitutes a decking. In the present instance, the carrier, designated generally by the reference numeral 16, is shown supported upon the trunk compartment top 14, although it is to be understood that the carrier 16 could as well be mounted upon the roof 12.

The device of the present invention consists in the carrier 16 and also means for loading and unloading a miniature racing automobile, as at 18 in FIGURES 3 and 4, onto and off of the carrier 16.

The carrier 16 includes a slatted platform 20 having spaced side edges 22 and 24 and end edges 26 and 28 extending between and connecting each of the adjacent ends of the side edges 22 and 24 together.

With reference to FIGURE 5, the platform 20 consists in four centrally located, longitudinally extending slat members 30 with side slat members 32 arranged on each side thereof. The slat members 32 are spaced apart a distance which does not permit passage therethrough of the periphery of a wheel 34 of the miniature racing automobile 18.

The platform 20 also includes two transverse slat members 36 in the center of the platform 20, with another transverse slat 38 on each side of the slat members 36. The slat members 36 and 38 underlie the slat members 30 and 32.

Adjacent each end edge 26 and 28 of the platform 20 is a transversely located end slat member 40 resting upon and secured to the slat members 30 and 32. A side rail 42 extends along the side edges 22 and 24 and is surmounted upon the end portions of the end slat members 40 and form elevated side walls for the platform 20.

A trackway section 44 is arranged in an upright direction and positioned along the end edge 28 of the platform 20 and has its lower end connected to the end edge 28 by a pivot pin 46 (FIGURE 6) for swinging movement of the section 44 from the upright position to an extended position outwardly of the platform 20, as shown in FIGURES 2 and 3. Another trackway section 48, arranged in lateral spaced relation with respect to the section 44, is similarly positioned in an upright direction along the side edge 24 and has its lower end connected to the end edge 28 of the platform 20 by means of another pin 46 for swinging movement from the upright position to an extended position outwardly of the platform 20, as above described with reference to the section 44.

Other trackway sections 50 and 52 are superimposed upon and spaced above the platform 20 and extend along each of the side edges 22 and 24, respectively, and have one end pivotally connected to the adjacent sections 44 and 48 respectively, inwardly of and spaced from the upper end of the latter for movement from the superimposed position to a position projecting longitudinally from the respective sections 44 and 48 when such sections have been moved to the extended position, as in FIGURE 3.

Still other sections of trackway, as at 54 and 56, in FIGURE 2, are positioned so that they rest upon the trackway sections 50 and 52 and have their one ends connected to the ends of the trackway sections 50 and 52 remote from the sections 44 and 48 for pivotal movement from the resting position of FIGURE 1, to an extended position outwardly of the sections 50 and 52 when the sections 44 and 48 and the sections 50 and 52 have been moved from the nested or closed condition shown in FIGURE 1, to the extended condition, shown in FIGURE 2.

Common bolts 58 connect the sections 50 and 52 to the sections 44 and 48 for their pivotal movement, and other bolts 60 are employed to secure the sections 44 and 50 in the extended position and the sections 48 and 52 in the extended position after they have been swung outwardly from the original position shown in FIGURE 1.

Hinge elements 62 pivotally connect the section 54 to the section 50 and connect the section 56 to the section 52 for their swinging movement from the position in which the sections 54 and 56 rest upon the sections 50 and 52, to the position in which they extend outwardly of said sections.

Releasable fastening means embodying a bolt 64, a positioning nut 66, and a wing nut 68 threadably carried by the bolt 64, secure the ends of the second sections 50 and 52 remote from the sections 44 and 48, and the ends of the third sections 54 and 56 remote from the sections 44 and 48 to the platform 20.

Each slat of each of the trackway sections is separated from the adjacent slats of the platform or next adjoining section by a washer 70, as shown in FIGURES 5 and 9 with respect to the platform 20 and the section 44. This prevents binding of the sections when they are moved from the closed or nested position to the open or operative position.

As shown in FIGURE 4, when the racing automobile 18 is positioned on the platform 20, the rear wheel 34 is engaged by the section 52 which prevents shifting of the automobile 18 on the platform 20. It is to be understood that the other rear wheel is engaged by the opposite section 50.

As shown in FIGURES 5 and 8, depending from each of the slat members 38 is a suction cup 72 adjustably secured thereto by a bolt 74. In FIGURE 8 the dotted line showing indicates an adjusted position of the suction cup 72 in order that the platform be positioned in a level condition on the decking, whether the top 12 or the trunk compartment top 14, as the case may be.

In use, the platform 20 is, with ease and facility, secured to the automobile decking with the upright trackway sections 44 and 48 facing either the side or the rear of the automobile, as desired.

The trackway sections 54 and 56 are easily unfolded from the sections 50 and 52 and the latter are easily and quickly arranged in longitudinal aligned relation with respect to the sections 44 and 48. The bolt 60 in each of the sections 44 and 48 is easily removed and quickly replaced to secure the sections 50 and 52 in the longitudinally aligned position with respect to the sections 44 and 48 so that they move as units rigid enough to support thereon the racing automobile 18 for movement of the latter upwardly onto the platform 20, or off of the platform 20, toward the ground surface.

It is a feature of the present invention that the slats of the trackway sections of the platform may be manufactured of wood, lightweight metal, such as aluminum, magnesium, or the like, and that fewer or more slats than shown and described may be employed to construct the platform or the trackway sections, as desired.

Also, while only a preferred form of the invention is shown and described, it is to be understood that other embodiments of the invention are contemplated, and numerous changes and modifications may be made therein without departing from the spirit of the invention as set forth in the appended claims.

What is claimed is:

1. For a vehicle having a decking, means for loading and unloading a miniature racing automobile on said decking, said means comprising a platform adapted to be temporarily supported on said decking, said platform including spaced side edges and an end edge extending between and connecting each of the adjacent ends of said side edges together, a first pair of laterally spaced trackway sections arranged in an upright direction positioned along one of the end edges of said platform and each having the lower end connected to said one of said end edges of said platform for swinging movement of said section from the aforesaid position to an extended position outwardly of said platform, and a second trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, and releasable fastening means securing each of the other ends of said second sections to the other end edge of said platform.

2. For a vehicle having a decking, means for loading and unloading a miniature racing automobile on said decking, said means comprising a platform adapted to be temporarily supported on said decking, said platform including spaced side edges and an end edge extending between and connecting each of the adjacent ends of said side edges together, a first pair of laterally spaced trackway sections arranged in an upright direction positioned along one of the end edges of said platform and each having the lower end connected to said one of said end edges of said platform for swinging movement of said section from the aforesaid position to an extended position outwardly of said platform, and a second trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, a third trackway section extending longitudinally of and resting upon each of said second sections and having one end thereof pivotally connected to the other end of said second section for swinging movement of said third section from the aforesaid position to an extended position outwardly of said second section when said second section and the adjacent first section have been moved to the extended positions, and releasable fastening means securing each of the other ends of said second sections and the adjacent one ends of said third sections to the other end edge of said platform.

3. For a vehicle having a decking, means for loading and unloading a miniature racing automobile on said decking, said means comprising a platform adapted to be temporarily supported on said decking, said platform including spaced side edges and an end edge extending between and connecting each of the adjacent ends of said side edges together, a first pair of laterally spaced trackway sections arranged in an upright direction positioned along one of the end edges of said platform and each having the lower end connected to said one of said end edges of said platform for swinging movement of said section from the aforesaid position to an extended position outwardly of said platform, and a second trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, and releasable fastening means securing each of the other ends of said second sections to the other end edge of said platform, the portion of each of said second sections adjacent said other end being adapted to overlie and engage the adjacent wheel of a miniature racing automobile when supported on said platform for restraining movement of said racing automobile relative to said platform.

4. For a vehicle having a decking, means for loading and unloading a miniature racing automobile on said decking, said means comprising a platform adapted to be temporarily supported on said decking, said platform including spaced side edges and an end edge extending between and connecting each of the adjacent ends of said side edges together, a first pair of laterally spaced trackway sections arranged in an upright direction positioned along one of the end edges of said platform and each having the lower end connected to said one of said end edges of said platform for swinging movement of said section from the aforesaid position to an extended position outwardly of said platform, and a second trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, and releasable fastening means embodying an elongated bolt and a wing nut threadably carried by said bolt securing each of the other ends of said second sections to the other end edge of said platform.

5. For a vehicle having a decking, means for loading and unloading a miniature racing automobile on said decking, said means comprising a slatted platform adapted to be temporarily supported on said decking, said platform including spaced side edges and an end edge extending between and connecting each of the adjacent ends of said side edges together, a first pair of laterally spaced slatted trackway sections arranged in an upright direction positioned along one of the end edges of said platform and each having the lower end connected to said one of said end edges of said platform for swinging movement of said section from the aforesaid position to an extended position outwardly of said platform, and a second slatted trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, and releasable fastening means securing each of the other ends of said second sections to the other end edge of said platform.

6. For a vehicle having a decking, means for loading and unloading a miniature racing automobile on said decking, said means comprising a slatted platform adapted to be temporarily supported on said decking, said platform including spaced side edges and an end edge extending between and connecting each of the adjacent ends of said side edges together, a first pair of laterally spaced slatted trackway sections arranged in an upright direction positioned along one of the end edges of said platform and each having the lower end connected to said one of said end edges of said platform for swinging movement of said section from the aforesaid position to an extended position outwardly of said platform, and a second slatted trackway section superimposed upon and spaced above said platform and extending along each of said side edges of said platform and having one end pivotally connected to the adjacent first section inwardly of and spaced from the upper end thereof for movement from the superimposed position to a position projecting longitudinally from said adjacent first section when the latter has been moved to the extended position, a third slatted trackway section extending longitudinally of and resting upon each of said second sections and having one end thereof pivotally connected to the other end of said second section for swinging movement of said third section from the aforesaid position to an extended position outwardly of said second section when said second section and the adjacent first section have been moved to the extended positions, and releasable fastening means securing each of the other ends of said second sections and the adjacent one ends of said third sections to the other end edge of said platform.

References Cited in the file of this patent

UNITED STATES PATENTS 2,722,326 Conroy ---------------- Nov. 1, 1955

FOREIGN PATENTS 533,104 Italy ---------------- Sept. 19, 1955